United States Patent

Tsuruta et al.

Patent Number: 5,332,016
Date of Patent: Jul. 26, 1994

[54] PNEUMATIC TIRES WITH SIDEWALL RECESSES

[75] Inventors: Makoto Tsuruta; Hiroyuki Iida; Yasuhiko Kobayashi; Hiroyuki Koseki, all of Kodaira, Japan

[73] Assignee: Bridgestone Corporation, Tokyo, Japan

[21] Appl. No.: 774,224

[22] Filed: Oct. 10, 1991

[30] Foreign Application Priority Data

Oct. 16, 1990 [JP] Japan .................................. 2-276677

[51] Int. Cl.⁵ .............................................. B60C 13/02
[52] U.S. Cl. ..................................... 152/523; 152/539
[58] Field of Search ................ 152/454, 523, 539, 544, 152/546, 552; D12/152

[56] References Cited

U.S. PATENT DOCUMENTS

| D. 179,374 | 12/1956 | Bishop | D12/152 |
|---|---|---|---|
| D. 207,573 | 5/1967 | Ueno | D12/152 |
| D. 208,615 | 8/1967 | Ueno | D12/152 |
| D. 208,616 | 9/1967 | Ueno | D12/152 |
| D. 208,617 | 9/1967 | Ueno | D12/152 |
| 3,400,746 | 9/1968 | Heimovics, Jr. | 152/523 |
| 3,452,799 | 7/1969 | Hindin et al. | 152/523 |
| 3,983,920 | 10/1976 | Gardner et al. | 152/544 |
| 4,185,676 | 1/1980 | Raluy | 152/544 |
| 4,201,261 | 5/1980 | Bartley et al. | 152/523 |

FOREIGN PATENT DOCUMENTS

| 1517850 | 12/1966 | France . | |
| 2131874 | 11/1972 | France | 152/523 |
| 2229562 | 12/1974 | France . | |
| 2415016 | 1/1978 | France . | |
| 0106106 | 5/1988 | Japan | 152/523 |
| 3186409 | 8/1991 | Japan | 152/539 |
| 69063 | 12/1973 | Luxembourg . | |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic tire comprising a pair of beads, and a carcass ply consisting of a main body located axially inside the beads and outer ply portions extending along the main body of the carcass ply axially outside each of the beads. A number of circumferentially spaced recesses are provided in the outer surface of the tire between a radially outer end of each of the outer ply portions and a location corresponding to a maximum width of the tire, and the recesses has a depth equal to 1/10 time to ½ time as large as a thickness of those portions of the tire which are provided with the recesses. The inclined angle of a base portion of each of the beads is about 15° relative to the rotary axis of the tire. In the tire, $0.4P \leq W \leq 0.8P$ and $B \leq 0.06D$ in which P, B, W and D are a circumferential pitch of the recesses, a minimum distance between the adjacent recesses, a circumferential width of each of the recesses which is obtained by deducting the minimum distance B from the pitch P, and a diameter of a rim base, respectively.

10 Claims, 3 Drawing Sheets

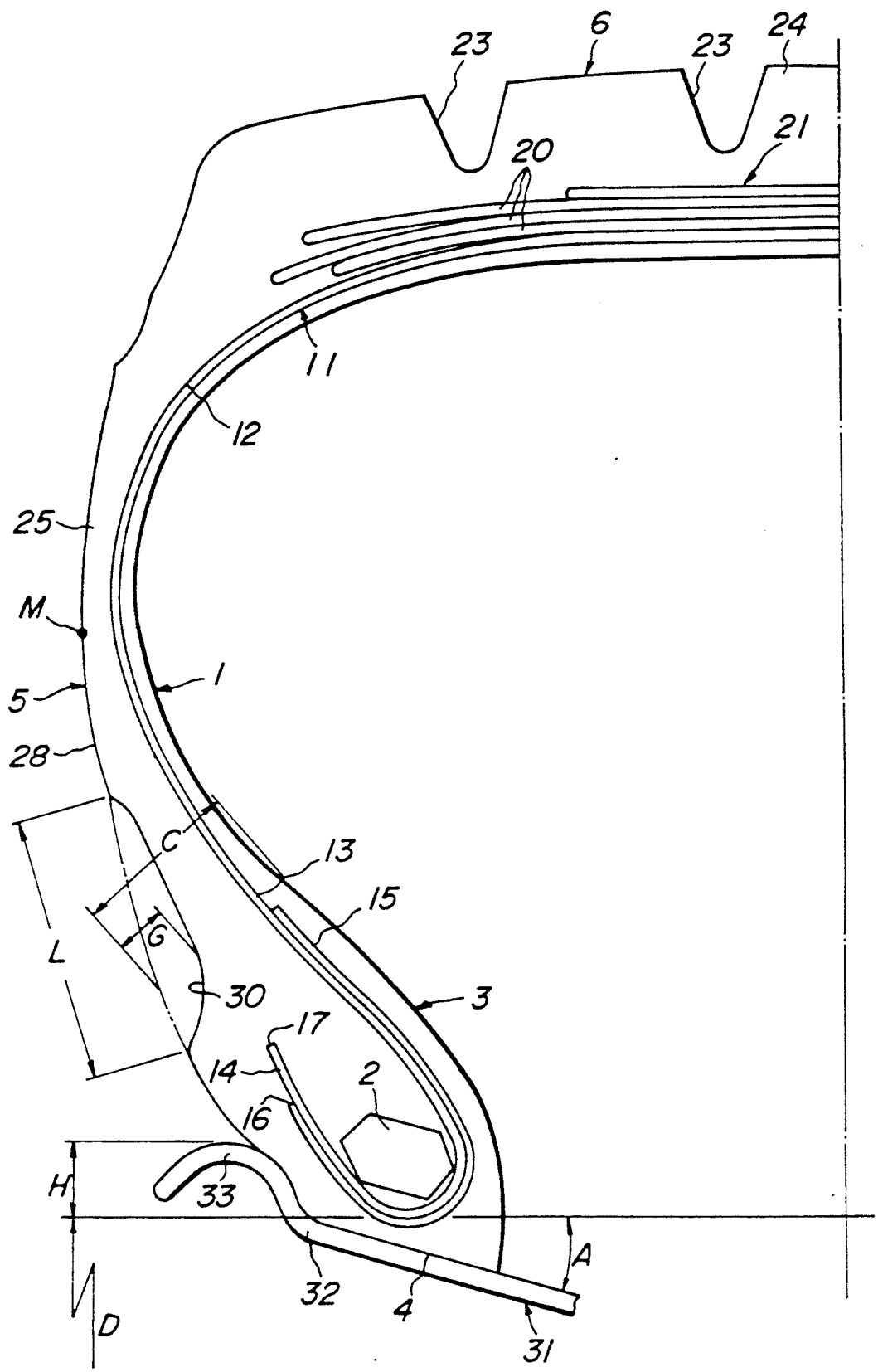
FIG_1

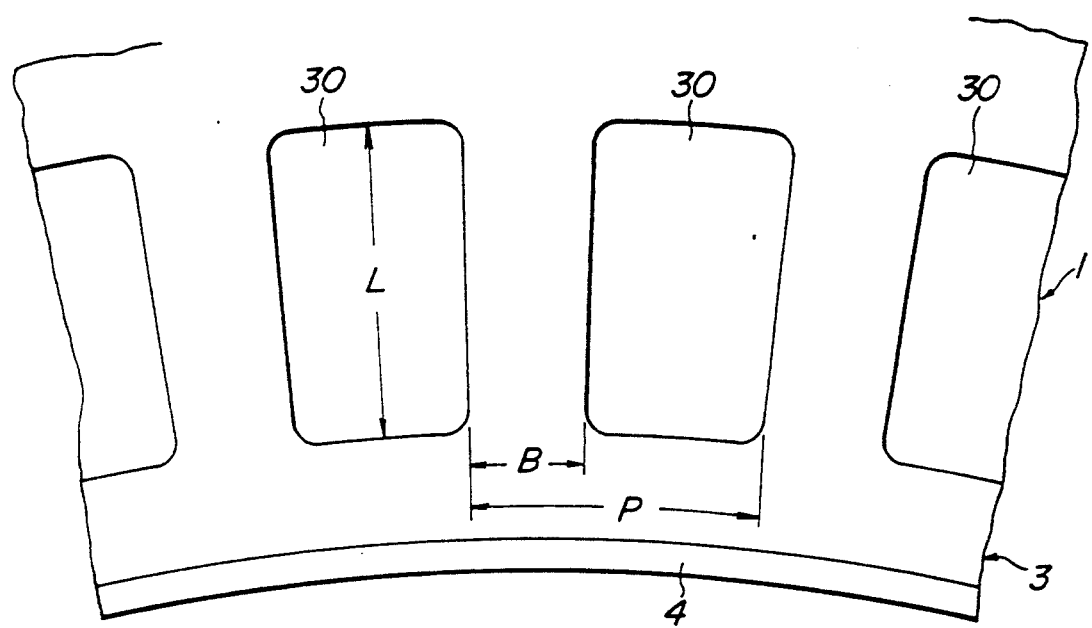
FIG_2

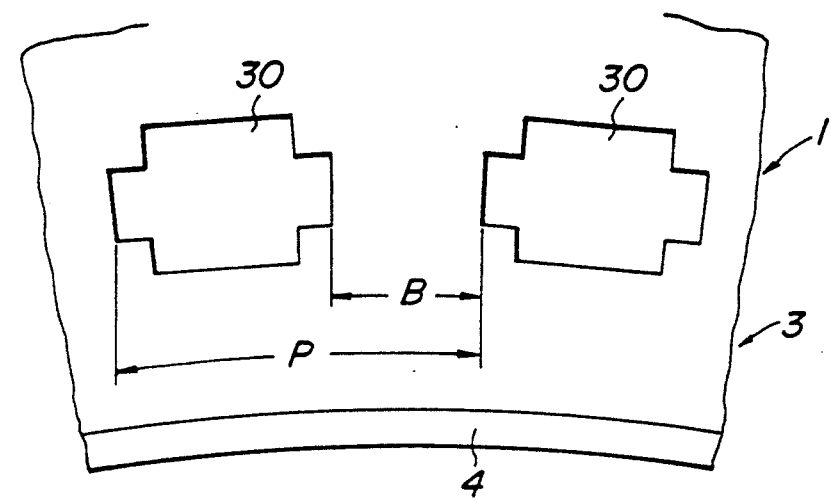
FIG_3
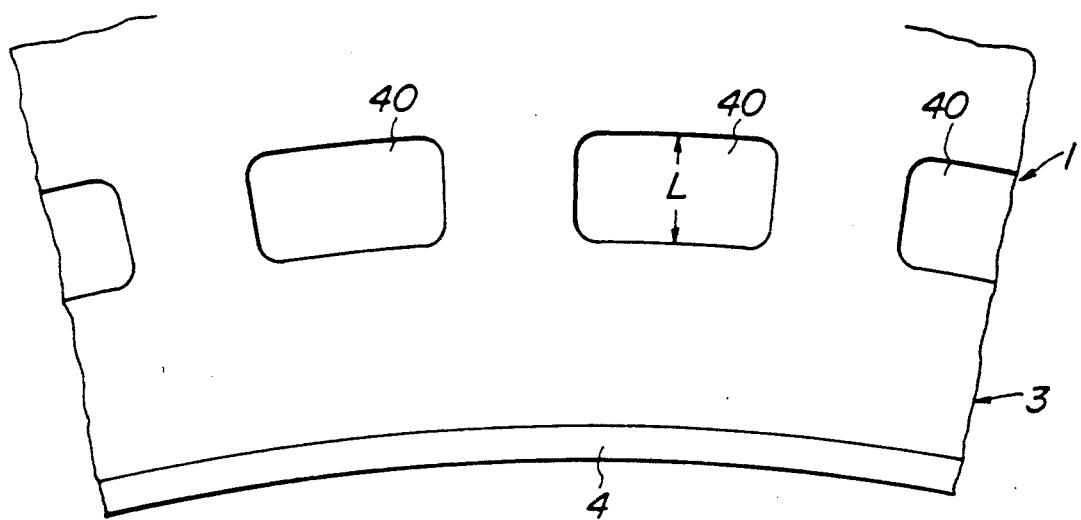
FIG_4

PNEUMATIC TIRES WITH SIDEWALL RECESSES

BACKGROUND OF THE INVENTION (1) Field of the Invention

The present invention relates to pneumatic tires in which durability of bead portions is improved.

(2) Related Art Statement

As pneumatic tires in which durability of bead portions are improved, tires described in GB 1210935 have been conventionally known. In each of those tires, a carcass ply has a main portion located axially inside beads and outer ply portions extending along the main portion and axially outside the beads, respectively. In the tire, recesses are formed in an outer surface of the tire and are spaced radially outwardly from a radially outer end of each of the outer ply portions by 10-50 mm and that the depth of the recesses is 1/10 times to ½ times as large as the thickness of those portions of the tire which are provided with the recesses. The recesses may circumferentially continue to one another or a number of recesses may be provided while being circumferentially spaced from one another.

The above-mentioned recess or recesses can improve durability of the bead without any problem in the case of the pneumatic tire described in GB 1210935 in which an inclined angle of a base portion of the bead is about 5° relative to a rotary axis of the tire. However, if such a recess or recesses are formed, without paying any consideration thereto, in the case of a pneumatic tire in which an inclined angle of a base portion of a bead is about 15° relative to a rotary axis of the tire and of which practical use conspicuously increases, the following problems occur. That is, since the pneumatic tire having the above inclined angle of about 5° is fitted to a rim having a considerably high rim flange being about 0.038 times to about 0.055 times as high as the diameter of a base portion of the rim, great forces occur between the bead portion of the tire and the rim flange to assuredly join the tire and the rim. Consequently, it is unnecessary to particularly increase the thickness of the bead portion in order to prevent slipping between the tire and the rim. However, since a rim flange of a fitting rim is low (about 0.020 times to about 0.029 times as high as the diameter of the base portion of the rim) in the case of the pneumatic tire having the above inclined angle of about 15°, tire-rim joining forces occurring between the bead portion of the tire and the rim flange are small. Therefore, in order that slipping between the tire and the rim as well as failure of the bead portion resulting from the slipping may be prevented by generating sufficient tire-rim joining forces between the base portion of the bead of the tire and a bead seat portion of the rim, the thickness of the base portion of the bead is increased. Further, in order that the bead portion may not be damaged owing to concentration of deformation in a rotational direction of the tire during rotating under load through rapid changes in rigidity in circumferential direction of the bead portion, the thickness of the bead portion is gradually decreased from near the base portion of the bead to a location corresponding to the maximum width of the tire. Although every portion constituting the bead portion shares the function to improve durability of the bead portion, problems as mentioned below occur if recesses described in the prior art are formed, without any particular consideration, in the tire having the inclined angle of the base portion of the rim being about 15° relative to the rotary axis of the tire. For example, if a recess is continuously formed in the circumferential direction, rigidity of the bead greatly decreases and deformation concentrates upon the tire during rolling under load in the rotating direction of the tire because the bead portion has the structure in which the thickness is inherently great and the rigidity in the circumferential direction is great. As a result, cracks (diagonal cracks) occur in the bottom of the recess in directions oblique to the circumferential direction of the tire, and these cracks progress into the interior of the tire to lower durability of the bead portion. Further, if a number of recesses are formed such that they are spaced from one another in the circumferential direction, the recesses cannot exhibit the effect of lowering the compression strain at the radially outer end of the outer ply portion depending upon the dimension of the recesses, with the result that durability of the bead portion cannot be improved, or the above diagonal cracks occur due to reduction in rigidity of the bead portion in the circumferential direction to lower the durability of the bead portion.

SUMMARY OF THE INVENTION

It is an object of the present invention to provide pneumatic tires in which an inclined angle of a base portion of a bead is about 15° relative to a rotary axis of the tire and a number of recesses are formed while being spaced from one another in a circumferential direction of the tire, wherein durability of the bead portion is improved, whereas circumferential rigidity of the bead portion is enhanced to a value sufficient for practical use.

The above object can be realized by the below-mentioned construction.

That is, the pneumatic tire according to the present invention includes pair of beads, and a carcass ply consisting of a main body located axially inside the beads and outer ply portions extending along the main body of the carcass ply and axially outside each of the beads. A number of circumferentially spaced recesses are provided in the outer surface of the tire between a radially outer end of each of the outer ply portions of the carcass ply and a location corresponding to a maximum width of the tire such that the recesses have a depth equal to 1/10 times to ½ times as large as a thickness of those portions of the tire which are provided with the recesses. An inclined angle of the base position of the bead is about 15° relative to the rotary axis of the tire. In this tire, $0.4P \leq W \leq 0.8P$ and $B \leq 0.06D$ in which P, B, W and D are a circumferential pitch of the recesses, a minimum distance between the adjacent recesses, a circumferential width of each recess which is obtained by deducting the minimum distance B from the pitch P, and a diameter of a rim base, respectively.

In general, in the case of the pneumatic tire having the inclined angle of the base portion of the bead relative to the rotary axis of the tire being about 15°, every portion constituting the bead portion shares the function to improve durability of the bead portion. Therefore, when a number of recesses are formed in an outer surface of the tire between the radially outer end of the outer ply portion and the location corresponding to the maximum width of the tire such that the depth of the recesses is 1/10 times to ½ times as large as the thickness of those portion of the tire which are provided with these recesses, an effect of enhancing durability of the bead portion cannot be exhibited by the recesses depending upon the dimension of the recesses, or deformation concentrates upon the tire in the rotating direction of the tire under application of load due to reduction in rigidity in the circumferential direction. As a result, diagonal cracks occur in the recesses to deteriorate the durability of bead portion.

For this reason, according to the present invention, W is not less than 0.4 times as large as P in which P and W are the circumferential pitch of the recesses, and that circumferential width of the recess which is obtained by deducting B from the pitch P, respectively, B being the minimum distance between the adjacent recesses. Thus, the existing rate of the recesses is not too low. Thereby, compression strain, which occurs at the radially outer end of the radially outer ply when the tire runs under load, is reduced so that durability of the bead portion is enhanced. Further, according to the present invention, the minimum distance B is not more than 0.06 times as large as the diameter D of the rim base, so that the recesses are substantially uniformly distributed in the circumferential direction to prevent the presence of recesses having no effect for enhancing durability of the bead portion because of too long distance between the adjacent recesses. Thereby, the recesses can exhibit the effect of uniformly and assuredly enhancing durability of the bead portion in the circumferential direction. In addition, an excessive rate of the recesses is avoided by setting the circumferential width W to not more than 0.8 times as great as the circumferential pitch P. Thereby, a conspicuous reduction in the circumferential rigidity of the bead portion is prevented, and the durability of the bead portion is enhanced by raising the circumferential rigidity of the bead portion to a level sufficient for practical use so that diagonal cracks may not occur at the recesses through concentration of deformation in the rotating direction of the tire.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a fragmentally sectional view of an embodiment of a tire according to the present invention along a meridian line;

FIG. 2 is a side view of a part of the tire in FIG. 1;

FIG. 3 is a side view of a part of another embodiment of a tire according to the present invention; and FIG. 4 is a side view of a part of a further embodiment of a tire according to the present invention.

DETAILED DESCRIPTION OF THE INVENTION

An embodiment of the tire according to the present invention will be explained below.

In FIGS. 1 and 2, a pneumatic radial tire 1 has a pair of bead portions 3 in which a bead 2 is buried. A bead base portion 4 of each of the bead portions 3 is inclined at an angle A of about 15° relative to a rotary axis of the tire 1. The tire 1 further includes a pair of sidewall portions 5 each extending substantially radially outwardly from the bead portion 3, and a substantially cylindrical tread portion 6 connecting radially outer ends of the sidewall portions 5. The tire 1 is reinforced with a toroidal carcass 11 extending from one of the bead portions 3 to the other. The carcass 11 is constituted by at least one carcass ply 12 in which a number of cords are buried in radial directions (meridian directions). The carcass ply 12 is constituted by a main body 13 and turn-up portions 14. The main body 13 is located axially inwardly of the beads 2. The turn-up portion 14 is turned up outwardly around the bead 2, and extends along the main body 13, that is, substantially in parallel with the main body 13, so that the turn-up portion is located axially outwardly of the bead 2 as an axially outer ply portion. In this embodiment, a reinforcing ply 15 is arranged radially inwardly of the carcass ply 12 at the bead portion 3, so that the turn-up portion 14 is reinforced with the reinforcing ply 15. Since that radially outer end portion 16 of the reinforcing ply 15 which is located on the axially outer side of the bead portion 2 is placed radially inwardly of the radially outer end 17 of the turn-up portion 14. Therefore, as mentioned above, the turn-up portion 14 corresponds to the outer ply. To the contrary, when the radially outer end 16 of the reinforcing ply 15 is located on the radially outer side of the radially outer end 17 of the turn-up portion 14, the reinforcing ply 15 corresponds to an outer ply portion.

A belt layer 21 consisting of at least two belt plies 20 is arranged radially outwardly of the carcass layer 11. In each of the belt plies 20, a number of circumferentially inclined reinforcing cords are buried, and these reinforcing cords are crossed between the adjacent belt plies 20. A top tread 24 is arranged radially outwardly on the belt layer 21, and the tread 4 is provided with grooves 23 such as main grooves and lateral grooves. Further, side treads 25 are arranged axially outwardly on opposite side portions of the carcass layer 3. A rim 31 is provided with a bead seat portion 32 inclined at about 15° relative to the rotary axis of the tire 1. When the tire 1 is fitted to the rim 31, each of the bead portions 3 of the tire 1 is seated on the bead seat portion 32. In the case of the rim 31 in which the inclination angle of the bead seat portion 32 is about 15°, the height H of the rim flange 33 is as low as 0.020 to 0.029 times as great as the diameter D of the rim base. Consequently, it is difficult to control circumferential slipping between the tire 1 and the rim 31 only with joining forces between the bead portion 3 and the rim flange 33. Therefore, the thickness of the bead base portion 4 of the tire 1 to be fitted to this rim is made greater so that slipping between the tire 1 and the rim 31 and failure of the bead portion due to this slipping may be prevented by generating joining forces forth tire 1 and the rim 31 between the bead base portion 4 and the bead seat portion 32. Further, the thickness of the bead portion 3 is made gradually greater from near the bead base portion 4 to the maximum width location M of the tire so that the bead portion 3 may not be fractured through concentration of deformation in the circumferential direction of the tire during rotation under application of a load owing to rapid change in the circumferential rigidity of the bead portion 3.

When the above tire is turned under application of a load, the sidewall portion 5 on a ground-contacting side of the tire 1 is deflected upon receipt of reaction forces from road. As a result, stress occurs inside the deflected portion, and this internal stress causes great compression strain at the radially outer end 17 of the turn-up portion 14. For this reason, in this embodiment, a number of recesses 30 are formed in an outer surface 28 of the tire and spaced from adjacent ones in the circumferential direction. The depth G of the recesses at the deepest location is equal to 1/10 to ½ times as great as the thickness of the tire at the location where the recesses are formed. The recess 30 has only to be formed such that the deepest portion is located between the radially outer end 17 of the turn-up portion 14 and the maximum width location M of the tire. For example, the radially outer portion of the recess 30 may be partially extended radially outwardly beyond the maximum width location M of the tire. Alternatively, the radially inner portion of the recess 30 may be partially extended radially inwardly beyond the radially outer end 17 of the turn-up portion 14. By so constructing the tire, the internal stress which occurs on the radially outer side of the recesses 30 can be interrupted by these recesses 30 so that influence of the internal stress upon the radially outer end 17 of the turn-up portion can be reduced.

As mentioned above, in the case of the tire 1 in which the inclined angle A of the bead base portion 4 is about 15°, every portion constituting the bead portion 3 shares function to improve durability of the bead portion 3. Accordingly, when a number of the above recesses 30 are formed, there is a possibility that the effect of improving the durability of the bead portion by the recesses 30 cannot be exhibited depending upon the dimension of the recesses 30, or deformation concentrates in the rotating direction of the tire during running under application of load owing to reduction in rigidity in the circumferential direction, so that diagonal cracks occur in the recesses to deteriorate durability of the bead portion. For this reason, in this embodiment, W is not less than 0.4 times as great as P in which P and W are the circumferential pitch of the recesses 30, and the circumferential width of the recess 30 which is obtained by deducting B from the pitch P, B being the minimum distance between adjacent recesses 30. If the circumferential groove W is less than 0.4 times as great as the circumferential pitch P, the existing ratio rate of the recesses 30 in the circumferential direction is so small that the effect of improving the durability of the bead portion 3 by the recesses 30 is almost lost. The circumferential pitch P means a circumferential length between radially innermost points of circumferentially one side edges of adjacent two recesses on circumferentially outermost sides. The circumferentially outermost side means that line or point on one side edge of a given recess which passes a radial straight line extending from a rotary axis of the tire and giving a maximum open angle to the opposite circumferential outermost side of the recess. Therefore, when the recess 30 is not rectangular but a cross shape as shown in FIG. 3, the circumferential pitch P is one shown in FIG. 3.

Further, the minimum distance B is not more than 0.06 times as great as the diameter D of the rim base. The reason is that if the minimum distance B is more than 0.06 times as great as the diameter D of the rim base, the distance between the recesses 30 is so great that there occur locations which cannot exhibit the effect of improving the durability of the bead portion 3 by the recesses 30.

Moreover, the circumferential width W is not more than 0.8 times as great as the circumferential pitch P. The reason is that if the circumferential width W is more than 0.8 times as great as the circumferential pitch P, the existing rate of the recesses 30 in the circumferential direction is so great that the circumferential rigidity of the bead portion 30 becomes less than a level capable of withstanding practical use to deteriorate durability of the bead portion 3.

By constructing as mentioned above, the compression strain near the radially outer end of the turn-up portion 14 can be assuredly reduced, so that separation is prevented there to improve durability of the bead portion 3.

Next, test examples of the tires according to the present invention will be explained. In the test, Comparative Tire Nos. 1 through 5 and Test tire Nos. 1 through 4 were prepared. Comparative Tire No. 1 had, on a tire outer surface, a number of recesses in which a W/P value and a B/D value were 0.306 and 0.0892, respectively. Comparative Tire No. 2 had, on a tire outer surface, a number of recesses in which a W/P value and a B/D value were 0.298 and 0.0297, respectively. Comparative Tire No. 3 had, on a tire outer surface, a number of recesses in which a W/P value and a B/D value were 0.897 and 0.0892, respectively. Comparative Tire No. 4 had, on a tire outer surface, a number of recesses in which a W/P value and a B/D value were 0.897 and 0.0297, respectively. Comparative Tire No. 5 had, on a tire outer surface, a number of recesses in which a W/P value and a B/D value were 0.589 and 0.0892, respectively. Test Tire No. 1 had, on a tire outer surface, a number of recesses in which a W/P value and a B/D value were 0.410 and 0.0297, respectively. Test Tire No. 2 had, on a tire outer surface, a number of recesses in which a W/P value and a B/D value were 0.597 and 0.0297, respectively. Test Tire No. 3 had, on a tire outer surface, a number of recesses in which a W/P value and a B/D value were 0.794 and 0.0297, respectively. Test Tire No. 4 had, on a tire outer surface, a number of recesses in which a W/P value and a B/D value were 0.606 and 0.0595, respectively. The size of each of the tires was 11/70 R 22.5. In each tire, substantially rectangular recesses were circumferentially formed in each of the sidewall portions at a location spaced radially outwardly from a radially outer end of a turn-up portion by a substantially equal distance of 15 mm. The recess had a depth G equal to ⅓ of the thickness C (28 mm) of the tire and a radial length L being 45 mm.

In the test, the tire was run on a drum at an internal pressure of 8.5 kg/cm$^2$ under application of a load of 5,000 kg until a bead portion was broken. Results are given below by index, taking that of Comparative Tire No. 1 as 100. Indexes of Comparative Tire Nos. 2, 3, 4 and 5 were 104, 90, 95 and 104, respectively. Those of Test Tire Nos. 1, 2, 3 and 4 were 118, 124, 128 and 118, respectively. Thus, it is seen that each of Test Tires Nos. 1–4 improved durability of the bead portion. The above index of 100 actually corresponded to a total run distance of 23,700 km. The broken states of the tires were as follows: In Comparative Tire Nos. 1, 2 and 5 and Test Tire Nos. 1, 2 and 4, the tire was broken by separation at a radially outer end of the turn-up portion of the carcass ply as an outer ply portion. In Comparative Tire Nos. 3 and 4, the tire was broken by propagation and development of diagonal cracks formed in the recesses in the outer surface portion of the tire into the interior of the tire. Comparative Tire No. 3 suffered these two problems.

In the illustrated embodiment, the radial length L of the recess 30 formed in the outer surface 28 of the tire is set to a great value, for example, to about 0.6 times as great as the maximum width location M of the tire from the radially outer end 17 of the turn-up portion 14. However, as illustrated in FIG. 4, the radial length L of the recess 40 may be set to a small value, for example, about 0.3 times as great as the distance from the radially outer end of the turn-up portion 14 to the maximum width location M of the tire. Further, in the above-mentioned embodiments, although the circumferential pitch P and the circumferential width W are made constant, respectively, for each tire, according to the present invention, they may be varied in the circumferential direction.

As explained above, according to the present invention, the circumferential rigidity of the bead portion can be enhanced to a high level enough to withstand practical use and to improve durability of the bead portion.

What is claimed is:

1. A pneumatic tire comprising; a pair of beads, a carcass ply, said carcass ply having a main body located axially inside the beads and outer ply portions extending along the main body of the carcass ply and axially outside each of the beads, a number of circumferentially spaced recesses being provided in an outer surface of the tire between a radially outer end of each of the outer ply portions and a location corresponding to a maximum width of the tire, said recesses having a depth equal to 1/10 to ½ times as large as a thickness of those portions of the tire which are provided with the recesses, an inclined angle at a base portion of each of the beads being about 15° relative of a rotary axis of the tire, wherein $0.4P \leq W \leq 0.8P$ and $B \leq 0.06D$ in which P is a circumferential pitch of the recesses, B a minimum distance between the adjacent recesses, W a circumferential width of each of the recesses which is obtained by deducting the minimum distance B from the pitch P, and D a diameter of a portion of a tire located at a same radial level as that of a rim base of a normal rim when said tire is fitted and mounted to such a normal rim.

2. The pneumatic tire according to claim 1, wherein a radial length of the recess is set to not less than 0.3 times as great as a distance from the radially outer end of the turn-up portion to the maximum width location of the tire.

3. The pneumatic tire according to claim 1, wherein the circumferential pitch P and the circumferential width W are made constant in a circumferential direction.

4. The pneumatic tire according to claim 1, wherein the circumferential pitch P and the circumferential width W are varied in a circumferential direction.

5. The pneumatic tire according to claim 1, wherein a ratio of W/P is 0.410 and a ratio of B/D is 0.0297.

6. The pneumatic tire according to claim 1, wherein a ratio of W/P is 0.597 and a ratio of B/D is 0.0297.

7. The pneumatic tire according to claim 1, wherein a ratio of W/P is 0.794 and a ratio of B/D is 0.0297.

8. The pneumatic tire according to claim 1, wherein a ratio of W/P is 0.606 and a ratio of B/D is 0.0595.

9. The pneumatic tire according to claim 1, wherein each of said recesses are substantially rectangular shapes having a depth equal to ⅓ of the thickness of the tire at the location of said recesses.

10. The pneumatic tire according to claim 9, wherein each of said recesses has a radial length of approximately 45 mm.

* * * * *